(12) United States Patent
Sugawara et al.

(10) Patent No.: US 7,717,967 B2
(45) Date of Patent: May 18, 2010

(54) METHOD FOR MANUFACTURING A SOLID ELECTROLYTIC CAPACITOR

(75) Inventors: Yasuhisa Sugawara, Sendai (JP); Masako Ohya, Sendai (JP); Katsuhiro Yoshida, Sendai (JP)

(73) Assignee: NEC TOKIN Corporation, Sendai-shi (JP)

( * ) Notice: Subject to any disclaimer, the term of this patent is extended or adjusted under 35 U.S.C. 154(b) by 0 days.

(21) Appl. No.: 12/205,049

(22) Filed: Sep. 5, 2008

(65) Prior Publication Data

US 2009/0056093 A1 Mar. 5, 2009

(30) Foreign Application Priority Data

Sep. 5, 2007 (JP) ............................. 2007-229660

(51) Int. Cl.
*H01G 9/00* (2006.01)
(52) U.S. Cl. ...................................... 29/25.03; 361/528
(58) Field of Classification Search ................ 361/528, 361/523, 529, 532, 525; 29/25.03
See application file for complete search history.

(56) References Cited

U.S. PATENT DOCUMENTS 3,024,095 A * 3/1962 Fincham ..................... 216/109
3,332,859 A * 7/1967 Dunn et al. .................. 205/152
6,894,890 B2 * 5/2005 Takatani et al. ............. 361/532
2001/0003501 A1 * 6/2001 Hayashi et al. ............. 361/523

FOREIGN PATENT DOCUMENTS

JP        403053511 A  *  3/1991
JP        2004-335630 A    11/2004

* cited by examiner

*Primary Examiner*—Walter L Lindsay, Jr.
*Assistant Examiner*—Reema Patel
(74) *Attorney, Agent, or Firm*—Frishauf, Holtz, Goodman & Chick, P.C.

(57) ABSTRACT

A method for manufacturing a solid electrolytic capacitor has the steps of: mixing valve metal powders with organic binder for granulation, press-molding granulated powders embedded with a valve metal lead, sintering a press-molded compact in vacuum to produce a sintered body, and anodizing the sintered body to form a dielectric oxide film layer. The method further has a step of performing a cathode electrolytic cleaning to the sintered body before the step of forming the dielectric oxide film layer. The cathode electrolytic cleaning is performed in an acid solution, which is a mixed acid solution of hydrofluoric acid, nitric acid, and sulfuric acid.

13 Claims, 4 Drawing Sheets

-- Prior Art --

METHOD FOR MANUFACTURING A SOLID ELECTROLYTIC CAPACITOR

This application is based upon and claims the benefit of priority from Japanese patent application No. 2007-229660, filed on Sep. 5, 2007, the disclosure of which is incorporated herein in its entirety by reference.

BACKGROUND OF THE INVENTION

1. Field of the Invention

The present invention relates to a solid electrolytic capacitor, and particularly to a method for manufacturing a solid electrolytic capacitor using a sintered body of valve metal.

2. Description of the Related Art

Solid electrolytic capacitors employ, as an anode, valve metal such as tantalum, niobium, and aluminum. Solid electrolytic capacitors represented by tantalum capacitors, niobium capacitors use a high melting point material as a valve metal. In these capacitors, anode members are fabricated by sintering a pressed compact of valve metal powders FIG. 4 is typical example of such capacitors. In FIG. 4, a solid electrolytic capacitor 100 has an anode body 1 in which an anode lead 2 is embedded, a solid electrolyte layer 4 formed on an oxide film layer 3 on the surface of the anode body 1, a graphite layer 5, and a silver layer 6, formed over the surface of the solid electrolyte layer 4. The anode lead 2 is connected with an anode terminal 9, and the silver layer 6 is fixed, through a silver adhesive layer 7, to a cathode terminal 10. The entire body is covered with a resin mold 8 with the anode and cathode terminals 9, 10 exposed to the bottom the capacitor.

An anode body used in such a solid electrolytic capacitor is formed through various steps. Referring to a process flow diagram in FIG. 3, valve metal powders are mixed and granulated with organic binder in order to improve fluidity of the powders in press-molding valve metal powders and adhesiveness among the powders after press-molding (at S1). Next, the granulated powders are press-molded to produce a pressed compact thereof (at S2). The compact is sintered in vacuum to form a sintered body (at S3), and then a dielectric oxide film layer is formed through anodization to provide the anode body (at S4). Further, to complete a solid electrolytic capacitor, a solid electrolyte is formed on the dielectric oxide film layer of the anode body (at S5). Subsequently, a graphite layer is formed on the solid electrolyte (at S6) and a silver layer is formed on the graphite layer (at S7). Then, electrical connections are made between the silver layer and a cathode terminal and between an anode lead and an anode terminal (at S8), and an overmolding process follows (at S9).

Organic binder used in the granulation step is generally removed by thermal decomposition and flying in all directions in the sintering step in vacuum. However, in this removal process, residuals of the organic binder are easy to remain on the sintered body. In the case where binder residuals remain on the sintered body of valve metal, impurities such as charred metals are formed in an oxide film formed thereafter, and a problem arises that such impurities cause leakage current in a completed capacitor.

Typically, solid electrolytic capacitors having, for example, a rated voltage of 10V and a capacitance of 10 μF show a leakage current of 10 μA or less. However, further reduction in leakage current is required. Typically, 1 μA or less is preferred.

Japanese Unexamined Patent Application Publication (JP-A) No. 2004-335630 discloses a method for manufacturing a solid electrolytic capacitor in which the binder residual concentration of the sintered body is reduced to suppress leakage current. According to the method, water soluble solid binder and organic solvent soluble binder are used as binders for the granulation process. In order to remove the binders from a shaped form, two dissolution cleaning processes of organic solvent immersion and warm pure water immersion are performed in series between the press-molding and the sintering.

SUMMARY OF THE INVENTION

However, this method eventually removes binder before valve metal powders are tightly bonded by sintering. As a result, the mechanical strength of the obtained sintered body becomes weakened and cracks are easy to occur in the formed shape, leading to deterioration in the yield rate.

The present invention provides a method for manufacturing a solid electrolytic capacitor in which binder residuals are removed and leakage current is capable of being suppressed without lowering the mechanical strength of a sintered body of valve metal powders which serve as an anode body of a solid electrolytic capacitor.

According to the present invention, the invention provides a method for manufacturing a solid electrolytic capacitor which comprises the steps of: mixing valve metal powders with organic binder for granulation; press-molding granulated powders embedded with a valve metal lead to provide a compact, sintering the compact in vacuum to produce a sintered body; cathode-electrolytic cleaning the sintered body to produce a cleaned sintered body; and anodizing the cleaned sintered body to form a dielectric oxide film layer thereon. The cathode-electrolytic cleaning of the sintered body is made before forming the dielectric oxide film layer.

The cathode electrolytic cleaning is preferably performed in an acid solution.

The acid solution may comprise a mixed acid solution of hydrofluoric acid, nitric acid, and sulfuric acid.

The acid solution may comprise a mixed acid solution of nitric acid, and sulfuric acid.

The cathode electrolytic cleaning may be performed in a sodium hydrate aqueous solution.

The valve metal powders comprise tantalum powders.

The method for manufacturing a solid electrolytic capacitor may further comprise steps of forming a cathode layer including an electrolytic layer on the dielectric oxide film layer;

connecting the cathode layer to an cathode terminal with an conductive adhesives;

connecting the anode lead to an anode terminal; and molding an entire element with resign with the anode terminal and the cathode terminal exposed at the bottom of the capacitor.

The cathode layer forming step further may comprise steps of forming a graphite layer on the electrolytic layer, and forming a silver layer on the graphite layer.

According to another aspect of the invention, there is provided a method for manufacturing an anode body for use in a solid electrolytic capacitor comprising the steps of: mixing valve metal powders with organic binder for granulation, press-molding granulated powders embedded with a valve metal lead to provide a compact, sintering the compact in vacuum to produce a sintered body, cathode-electrolytic cleaning the sintered body, and anodizing the sintered body to form a dielectric oxide film layer thereon. The cathode-electrolytic cleaning of the sintered body is made before forming the dielectric oxide film layer.

In this invention, execution of the cathode electrolytic cleaning process to the sintered body between the sintering step and the dielectric oxide film layer forming step enables binder residuals to be efficiently removed from the sintered body. Also, since binder residuals are removed after sintering, this method does not have an adverse effect on the mechanical strength of the sintered body which is otherwise impaired. A solid electrolytic capacitor obtained by using this method is capable of suppressing leakage current.

BRIEF DESCRIPTION OF THE DRAWINGS

A more complete understanding of the invention may be obtained from a consideration of the following description in conjunction with the drawings.

DETAILED DESCRIPTION OF EXEMPLARY EMBODIMENTS

The present invention is hereinafter described in detail with reference to FIGS. 1 and 2.

A fabrication method of a solid electrolytic capacitor in accordance with the exemplary embodiment employs substantially similar processes used in a conventional method. The exemplary embodiment differs in that a cathode electrolytic cleaning process is applied to a sintered body between a sintering step and a dielectric oxide film layer forming step. Materials and shapes and the like employed in the fabrication of the capacitor are the same as those in conventional ones. Therefore, description except for the cathode electrolytic cleaning process will be simplified. A completed solid electrolytic capacitor takes, for example, a form shown in FIG. 4.

Figure 1:
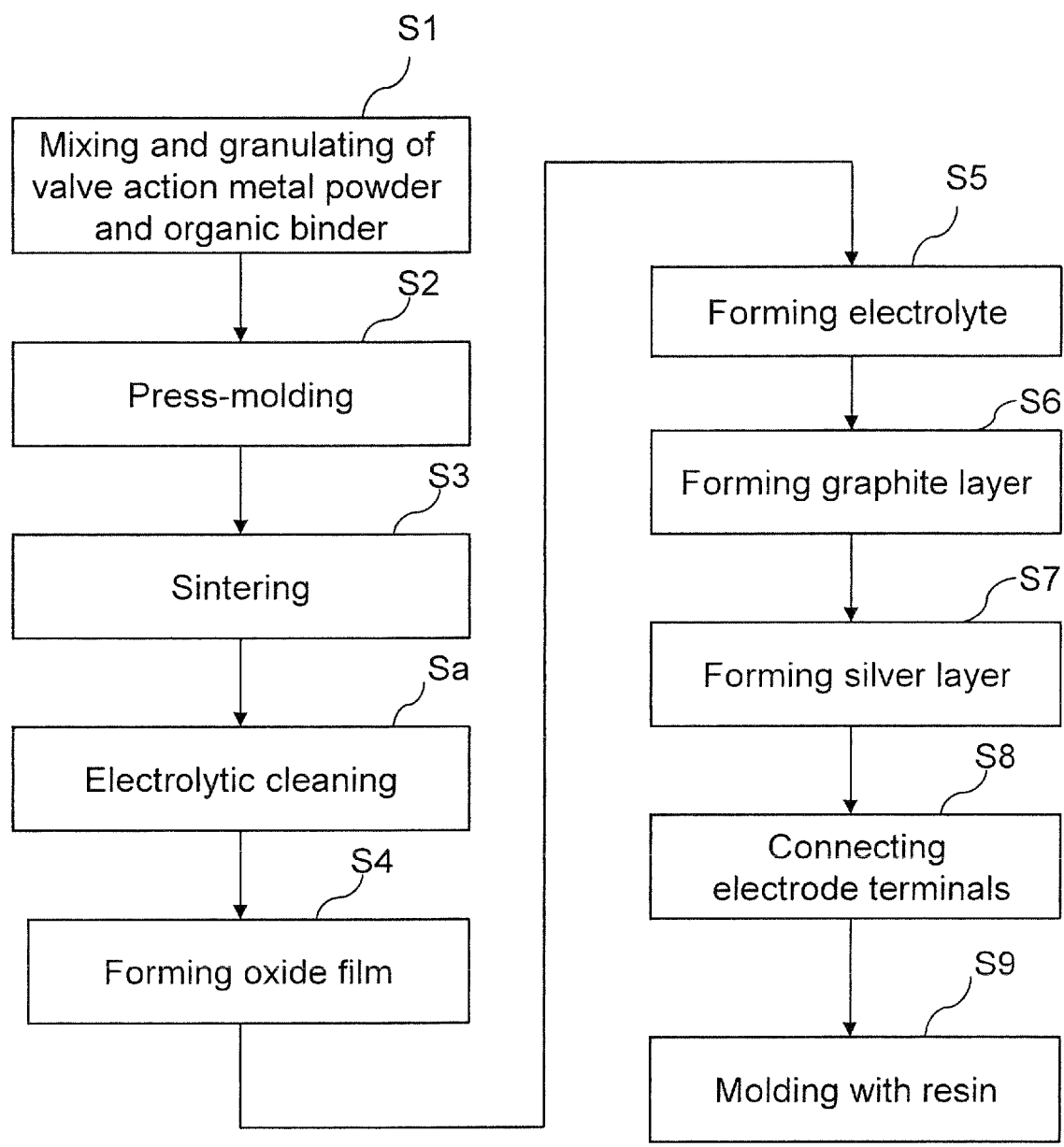
FIG. 1 shows a process flow for manufacturing a solid electrolytic capacitor in accordance with the exemplary embodiment of the present invention.
Figure 4:
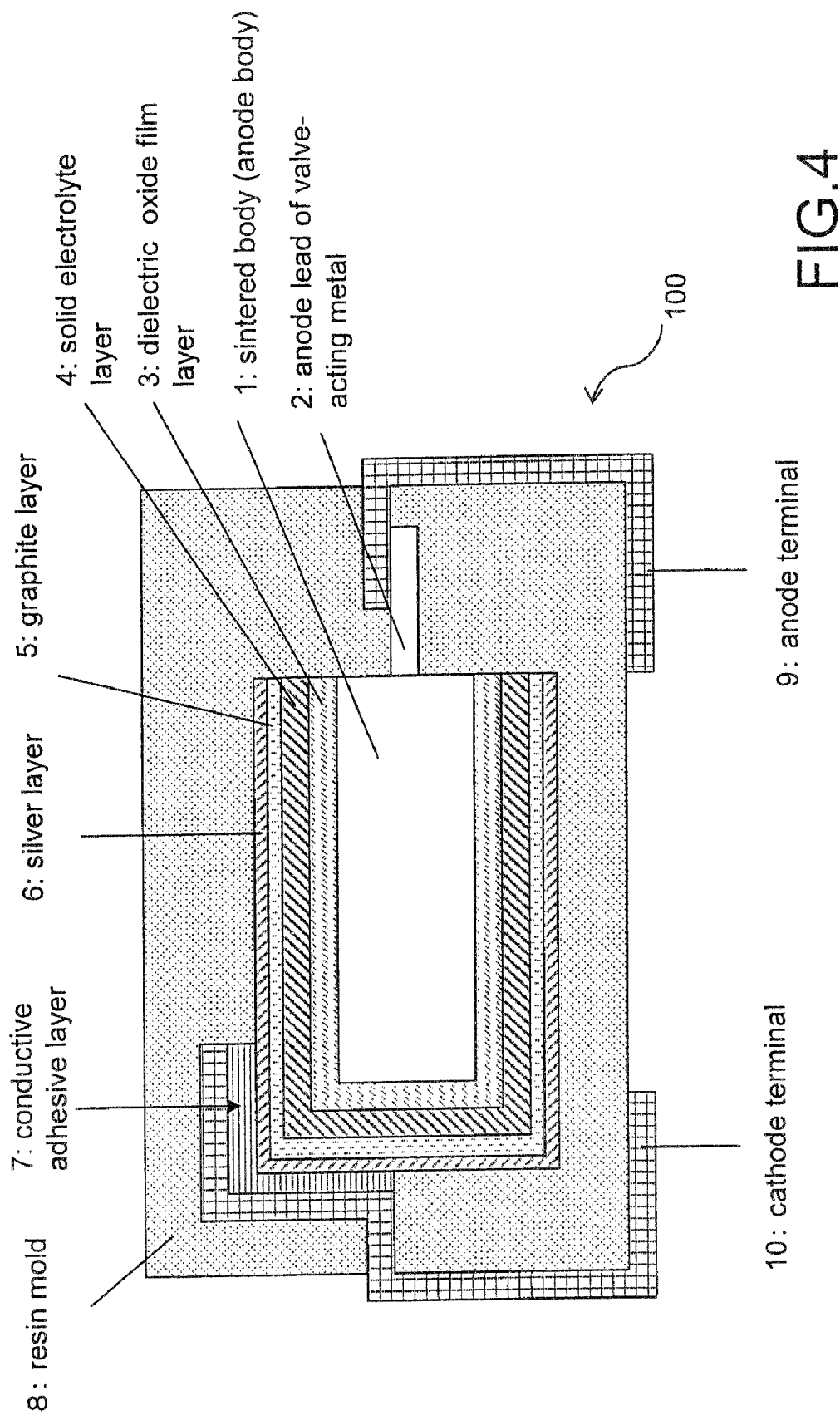
FIG. 4 shows a structure of a typical solid electrolytic capacitor in connection with the related art and the present invention.

Referring to FIG. 1 together with FIG. 4, a method for manufacturing a solid electrolytic capacitor according to the exemplary embodiment includes mixing valve metal powders with organic binder for granulation to produce granulated powders (at S1 in FIG. 1). The granulated powders are placed into a mold and a valve metal wire for a lead is embedded in the granulated powders. Then, the granulated powders in the mold are pressed to produce a molded form of a compact thereof (at S2). The compact of the granulated powders is sintered in vacuum to produce a sintered body (at S3). The sintered body is subjected to cathode-electrolytic cleaning (at Sa). Next, the cleaned sintered body is anodized to form a dielectric oxide film layer of the valve metal (at S4). Subsequently, a solid electrolyte layer is formed on the dielectric oxide film layer (at S5), a graphite layer is formed on the solid electrolyte layer (at S6), and a silver layer is formed on the graphite layer (S7). Then, connection of electrode terminals is made (at S8). That is, the silver layer is connected to a cathode terminal with conductive adhesives while the lead wire is connected to an anode terminal. Finally, an electrode-formed capacitor element is molded with a casing resin with the cathode terminal and the anode terminal exposed outside the resin and below a capacitor (at S9).

Figure 2:
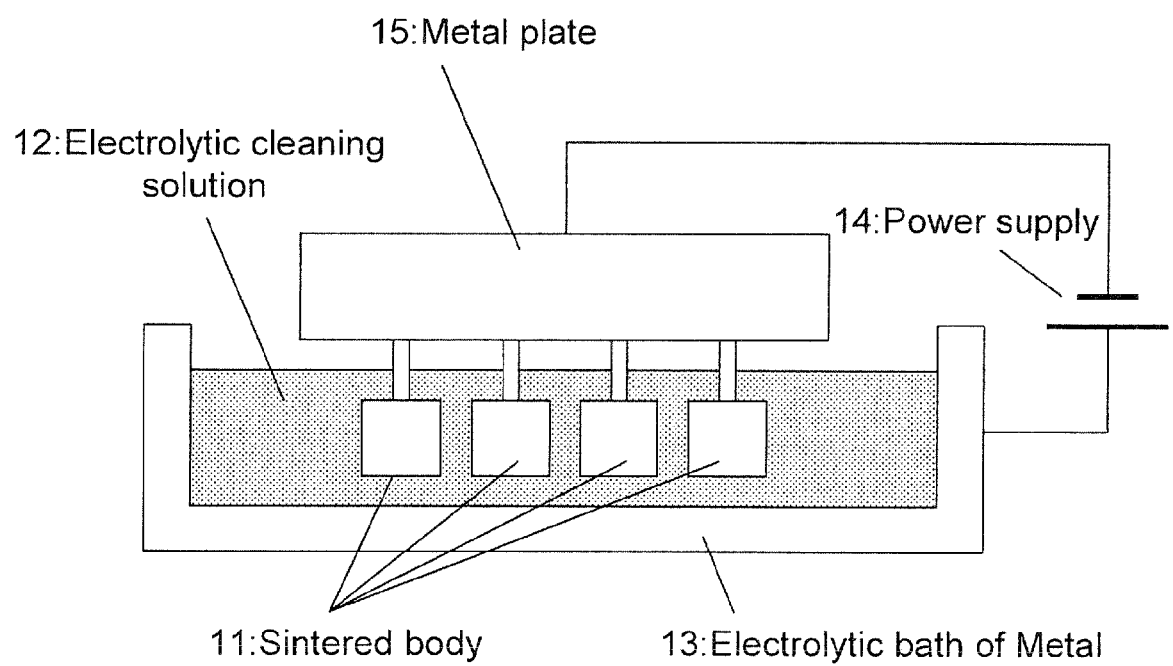
FIG. 2 schematically shows a cathode electrolytic cleaning processing unit used in the exemplary embodiment of the present invention.

Referring to FIG. 2, in the cathode electrolytic cleaning process used in the exemplary embodiment, a plurality of sintered bodies 11 of valve metal powders are each connected to a metal plate 15 by way of the leads of each sintered body, and are soaked in a metal tank, or electrolytic bath, 13 with an electrolytic solution. The metal plate 15 and the metal tank 13 are respectively connected to a negative electrode and a positive electrode of a power supply 14. The metal tank 13 also serves as an opposing electrode to the sintered body 11 which serves as a cathode electrode in electrolysis. The application of a voltage between the metal tank 13 and the sintered body 11 makes current flow in an electrolytic cleaning solution 12, and causes electrolysis onto the sintered body 11. The electrolysis causes a large quantity of hydrogen gas to generate on the surface of the sintered body 11, leading to efficient removal of impurities strongly attaching to the surface of the sintered body. This process enables binder residuals to be removed from the sintered body 11 without lowering the mechanical strength of the sintered body. As a result, a solid electrolytic capacitor using a cleaned sintered body thus fabricated is capable of suppressing leakage current substantially.

Preferably, the cathode-electrolytic cleaning process is performed in an acid solution. More preferably, it is performed in a mixed solution of hydrofluoric acid, nitric acid, and sulfuric acid. By performing the cathode electrolytic cleaning process in an acid solution, there can be attained not only physical removal of impurities through hydrogen gas generation but also chemical polishing of the surface. Particularly, by using the mixed acid solution, the great effect of surface chemical polishing can be attained.

EXAMPLES

Several preferred examples of the present invention will be described hereinafter in comparison with a conventional solid electrolytic capacitor.

Example 1

Solid electrolytic capacitors as illustrated in FIG. 4 are fabricated through a manufacturing process as shown in FIG. 1.

First, tantalum powders are mixed with organic binder to produce granulated powders (at S1). The granulated powders are put into a mold along with a tantalum lead wire and press-molded to form a press-molded compact of granulated tantalum powders having 2 mm in height, 1.5 mm in width, and 1 mm in thickness (at S2). Then, the press-molded compact is sintered in vacuum to form a sintered body (at S3).

Subsequently, the cathode-electrolytic cleaning is applied to the sintered body. That is, to remove binder residuals attaching to the sintered body, the sintered body is electrolytically cleaned in a sodium hydrate aqueous solution in an electrolyzer using the sintered body as a cathode electrode (at Sa).

Then, the cleaned tantalum sintered body in which binder residuals are removed is subjected to anodizing in an aqueous solution of phosphoric acid. Thus, the entire surface of the cleaned sintered body is covered with a dielectric film layer of tantalum oxide to provide an anode body for a tantalum solid electrolytic capacitor (at S5).

Next, the anode body is immersed for ten minutes in 20% by weight of a methanol solution of ferric dodecylbenzenesulfonate which serves as an oxidizing agent. Then, after drying it at 60° C. for thirty minutes, the anode body is immersed in a solution containing pyrrole for ten minutes to leave it at room temperature for thirty minutes for pyrrole polymerization. A series of polymerization such as filling an oxidant and filling pyrrole in which additives are added is carried out five times to form a solid electrolyte layer consisting of a conductive polypyrrole layer on the dielectric oxide film layer (at S5).

Thereafter, a graphite layer is formed on the solid electrolyte layer (at S6), and a silver layer is formed on the graphite layer (at S7). These processes make a capacitor element. Then, the silver layer is connected to a cathode terminal layer with electrically conductive adhesives and the metal lead is connected to an anode terminal (at S8). The electrode-formed capacitor element is overmolded with casing resin to complete a solid electrolytic capacitor of example 1 (at S9).

While in the example 1, conductive polypyrrole is used as the solid electrolyte layer, the same effect is also attainable by using a conductive polymer such as polythiophene, polyaniline and the like, a conductive organic complex such as 7,7,8,8-tetracyanoquinodimethane (TCNQ) and the like, or a conductive metal oxide such as manganese dioxide and the like.

Example 2

A solid electrolytic capacitor has been completed in the same way as the example 1 except that the cathode electrolytic cleaning process at step 4 is performed in an acid solution. That is, the cathode electrolytic cleaning is performed to the sintered body in a solution of mixed acid of phosphoric acid and sulfuric acid to remove binder residuals attaching to the sintered body. As the mixed acid used in the example 2, use is made of "P3 lavoxyd S" made in Henkel Japan Ltd.

Example 3

A solid electrolytic capacitor has been completed in the same way as the example 1 except that the cathode electrolytic cleaning process at step 4 is performed in a mixed acid solution. That is, the cathode electrolytic cleaning is performed to the sintered body in a solution of mixed acid of hydrofluoric acid, nitric acid, and sulfuric acid to remove binder residuals attaching to the sintered body.

Comparative Example

Figure 3:
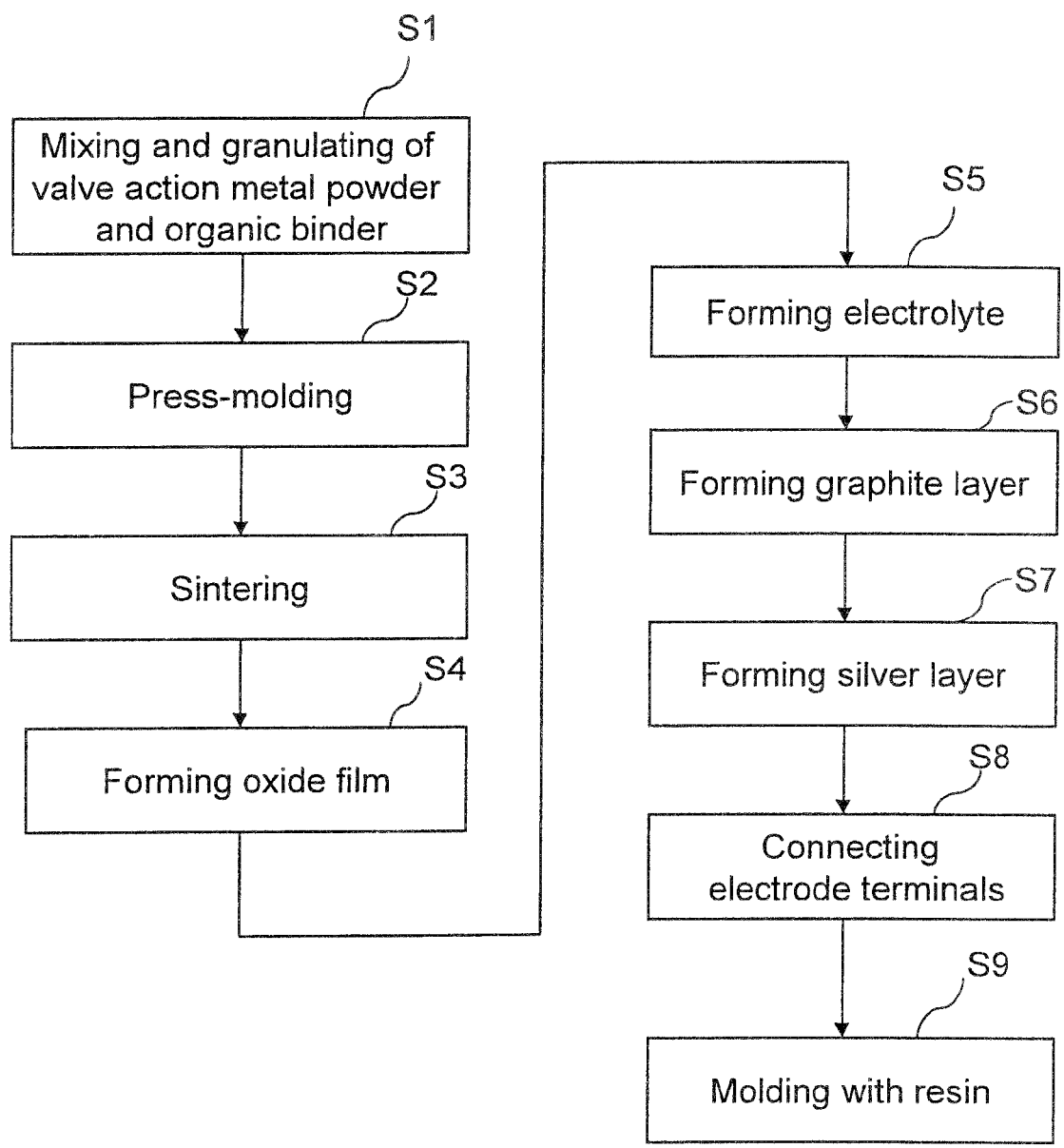
FIG. 3 shows a conventional process flow for manufacturing a solid electrolytic capacitor.

A comparative example has the same structure as shown in FIG. 4. A solid electrolytic capacitor has been completed using a manufacturing process as shown in FIG. 3. The process is the same as that of the example 1 except that the cathode electrolytic cleaning is not applied to the tantalum sintered body. Accordingly, a tantalum sintered body not subjected to electrolytic cleaning is supplied with a voltage in aqueous solution of phosphoric acid for anodizing, to have a dielectric film of tantalum oxide thereon. Thus, an anode body with the dielectric film of tantalum oxide is obtained.

Then, the anode body is immersed for ten minutes in 20% by weight of a methanol solution of ferric dodecylbenzenesulfonate, which serves as an oxidizing agent. Then, after drying it at 60° C. for thirty minutes, the anode body is immersed in solution containing pyrrole for ten minutes to leave it at room temperature for thirty minutes for pyrrole polymerization. A series of polymerization such as filling an oxidant and filling pyrrole in which additives are added is carried out five times to form a solid electrolyte layer consisting of a conductive polypyrrole layer on the dielectric oxide film layer.

Thereafter, the graphite layer is formed on the solid electrolyte layer, and the silver layer is formed on the graphite layer. After connecting the silver layer to a cathode terminal with electrically conductive adhesives and connecting the anode lead to an anode terminal, the electrode-formed capacitor element is overmolded with casing resin to complete a solid electrolytic capacitor of the comparative example.

Table 1 shows rated voltages, capacitances, and leakage currents of solid electrolytic capacitors in accordance with the examples 1 to 3 and the comparative example. Twenty pieces of samples were taken for evaluation for each example. Property values indicated in Table 1 are averaged ones over twenty pieces.

TABLE 1

|  | Rated Voltage (V) | Capacitance ($\mu$F) at 120 Hz | Leakage Current ($\mu$A) |
| --- | --- | --- | --- |
| Example 1 | 10 | 10.2 | 2.42 |
| Example 2 | 10 | 10.5 | 1.36 |
| Example 3 | 10 | 10.3 | 0.81 |
| Comparative Example | 10 | 10.5 | 4.87 |

Referring to Table 1, evaluations will be made on solid electrolytic capacitors in accordance with the examples 1 to 3 and the comparative example, respectively.

With regard to leakage current, solid electrolytic capacitors of examples 1 to 3 in which the cathode-electrolytic cleaning was performed show a significant reduction in leakage current, compared with that of the comparative example in which the cathode-electrolytic cleaning was not performed. Particularly, samples of examples 2 and 3, in which the cathode electrolytic cleaning was performed in the acid solutions, have greater effect on suppression of leakage current than example 1 in which the cathode electrolytic cleaning was performed in the alkaline solution. In the cathode electrolytic cleaning, hydrogen gas generated by electrolysis removes residuals of organic binder on the surface of the sintered body, and the removal of residuals prevents generation of impurities such as charred metals that could otherwise be formed in a dielectric oxide film formed thereafter. As a result, solid electrolytic capacitors with lowered leakage current can be provided. Particularly, the cathode-electrolytic cleaning in acid solutions has an additional effect of chemical polishing of the surface, cleaning away the residuals of organic binder sufficiently. Solid electrolytic capacitors manufactured in such manners show a smaller leakage current property.

The effect of chemical polishing of the surface is more apparent by comparing example 2 with example 3, in both of which the cathode-electrolytic capacitor was performed in acid solutions. Example 3 in which the cathode electrolytic-cleaning was performed in a mixed acid solution of hydrofluoric acid, nitric acid, and sulfuric acid having an excellent chemical surface-polishing power shows more reduction in leakage current than example 2 in which the cathode-electrolytic cleaning was performed in a mixed acid solution of phosphoric acid and sulfuric acid. In the examples, use was made of tantalum, which is acid-resistant, as the valve metal, and therefore, the difference in chemical surface-polishing powers depending on the employed acid solutions apparently provides the difference in leakage current.

As described above, in this invention, after sintering and before anodizing, a process step of cathode-electrolytic cleaning to the sintered body is adopted, enabling generation of impurities such as charred metals that could otherwise be formed in the dielectric oxide film to be prevented. As a result, solid electrolytic capacitors with lowered leakage current can be provided.

The preceding merely illustrates the principles of the invention. It will thus be appreciated that those skilled in the art will be able to devise various arrangements which, although not explicitly described or shown herein, embody the principles of the invention and are included within its spirit and scope. For example, although described in conjunction with tantalum solid electrolytic conductors, the concepts of the invention apply similarly to other type of solid electrolytic conductors using niobium powders as valve metal. While the solid electrolytic capacitors describe in the above have, as a cathode layer, an electrolyte layer, a graphite layer, and a silver layer, the invention is not limited to such a structure. That is, the cathode layer may include at least an electrolyte layer.

Although the invention has been described in terms of exemplary embodiments, it is not limited thereto. Rather, the appended claims should be construed broadly, to include other variant and embodiments of the invention, which may be made by those skilled in the art without departing from the scope and range of equivalents of the invention.

What is claimed is:

1. A method for manufacturing a solid electrolytic capacitor, the method comprising:
    mixing valve metal powders with organic binder for granulation;
    press-molding granulated powders embedded with a valve metal lead to provide a compact;
    sintering the compact in a vacuum to produce a sintered body;
    cathode-electrolytic cleaning the sintered body to produce a cleaned sintered body; and
    anodizing the cleaned sintered body to form a dielectric oxide film layer thereon;
    wherein the cathode-electrolytic cleaning of the sintered body is performed before forming the dielectric oxide film layer.

2. A method for manufacturing a solid electrolytic capacitor according to claim 1, wherein the cathode-electrolytic cleaning is performed in an acid solution.

3. A method for manufacturing a solid electrolytic capacitor according to claim 2, wherein the acid solution is a mixed acid solution of hydrofluoric acid, nitric acid, and sulfuric acid.

4. A method for manufacturing a solid electrolytic capacitor according to claim 2, wherein the acid solution is a mixed acid solution of nitric acid and sulfuric acid.

5. A method for manufacturing a solid electrolytic capacitor according to claim 1, wherein the cathode-electrolytic cleaning is performed in a sodium hydrate aqueous solution.

6. A method for manufacturing a solid electrolytic capacitor according to claim 1, wherein the valve metal powders comprise tantalum powders.

7. A method for manufacturing a solid electrolytic capacitor according to claim 1, further comprising:
    forming a cathode layer including an electrolytic layer on the dielectric oxide film layer;
    connecting the cathode layer to a cathode terminal with conductive adhesives;
    connecting the anode lead to an anode terminal; and
    molding an entire element with resin with the anode terminal and the cathode terminal exposed at the bottom of the capacitor.

8. A method for manufacturing a solid electrolytic capacitor according to claim 7, wherein forming the cathode layer comprises:
    forming a graphite layer on the electrolytic layer;
    and forming a silver layer on the graphite layer.

9. A solid electrolytic capacitor manufactured according to claim 1, wherein the solid electrolytic capacitor comprises a solid electrolytic tantalum capacitor.

10. A method for manufacturing an anode body for use in a solid electrolytic capacitor, the method comprising:
    mixing valve metal powders with organic binder for granulation;
    press-molding granulated powders embedded with a valve metal lead to provide a compact;
    sintering the compact in a vacuum to produce a sintered body;
    cathode-electrolytic cleaning the sintered body; and
    anodizing the sintered body to form a dielectric oxide film layer thereon;
    wherein the cathode-electrolytic cleaning of the sintered body is performed before forming the dielectric oxide film layer.

11. A method for manufacturing an anode body for use in a solid electrolytic capacitor according to claim 10, wherein the cathode-electrolytic cleaning is performed in an acid solution.

12. A method for manufacturing an anode body for use in a solid electrolytic capacitor according to claim 11,
    wherein the acid solution is a mixed acid solution of hydrofluoric acid, nitric acid, and sulfuric acid.

13. A method for manufacturing an anode body for use in a solid electrolytic capacitor according to claim 11, wherein the acid solution is a mixed acid solution of nitric acid and sulfuric acid.

* * * * *